(12) United States Patent
Maira et al.

(10) Patent No.: US 6,728,626 B2
(45) Date of Patent: Apr. 27, 2004

(54) INTERNAL COMBUSTION ENGINE WITH MEANS FOR UNIFORMING THE AMOUNT OF INTAKE AIR IN DIFFERENT CYLINDERS, AND METHOD THEREFOR

(75) Inventors: Massimiliano Maira, Turin (IT); Francesco Richard, Rivoli (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 0 days.

(21) Appl. No.: 10/419,243

(22) Filed: Apr. 21, 2003

(65) Prior Publication Data

US 2004/0002809 A1 Jan. 1, 2004

(30) Foreign Application Priority Data

Jul. 1, 2002 (IT) .................................... TO2002A0569

(51) Int. Cl.[7] .............................................. G06F 19/00
(52) U.S. Cl. .................... 701/114; 701/115; 123/90.12; 123/90.16
(58) Field of Search ................. 701/114, 115, 701/99, 101; 123/90.12, 90.16

(56) References Cited

U.S. PATENT DOCUMENTS

| | | | | |
|---|---|---|---|---|
| 3,960,121 A | * | 6/1976 | Backus | 123/255 |
| 4,176,651 A | * | 12/1979 | Backus | 123/27 GE |
| 4,223,654 A | * | 9/1980 | Wessel et al. | 123/358 |
| 4,841,935 A | | 6/1989 | Yamada et al. | |
| 5,351,660 A | * | 10/1994 | Logozzo | 123/73 V |
| 6,055,948 A | | 5/2000 | Shiraishi et al. | |
| 6,237,551 B1 | * | 5/2001 | Macor et al. | 123/90.15 |

FOREIGN PATENT DOCUMENTS

| | | |
|---|---|---|
| EP | 0 803 642 A1 | 10/1997 |
| EP | 0 931 912 A2 | 7/1999 |
| EP | 0 939 205 A1 | 9/1999 |
| EP | 03 008 425.5 | 10/2003 |

\* cited by examiner

Primary Examiner—John Kwon
(74) Attorney, Agent, or Firm—Sughrue Mion, PLLC

(57) ABSTRACT

In a multi-cylinder internal combustion engine, equipped with an electronically controlled hydraulic system for the variable operation of the engine's inlet valves, an indicator of the differences in the amount of air aspirated by the cylinders of the engine during the respective induction phase is provided and said system controls the various inlet valves of the engine in a differentiated manner, varying the time and/or opening travel for the purpose of minimizing the differences between the amounts of air aspirated by the various cylinders of the engine.

13 Claims, 4 Drawing Sheets

INTERNAL COMBUSTION ENGINE WITH MEANS FOR UNIFORMING THE AMOUNT OF INTAKE AIR IN DIFFERENT CYLINDERS, AND METHOD THEREFOR

BACKGROUND OF THE INVENTION

The present invention concerns internal combustion engines of the type that include an electronically controlled hydraulic system for variable operation of the engine's inlet valves.

In American patent U.S. Pat. No. 6,237,551, the Applicant has already proposed an engine including:

- at least one inlet valve for each cylinder, equipped with respective elastic means of return that push the valve towards a closed position, for controlling the respective inlet port,
- at least one camshaft for operating each inlet valve of the engine's cylinders via the respective valve lifters, each inlet valve being controlled by a respective cam of said camshaft.
- in which each of said valve lifters commands the respective inlet valve against the action of said elastic means of return via the interposition of hydraulic means including a pressurized fluid chamber,
- the pressurized fluid chamber associated with each inlet valve being suitable for connection via a solenoid valve to a discharge channel, for the purposes of decoupling the valve from its respective valve lifter and provoking rapid closure of the valve under the effect of the elastic means of return, and
- electronic means of control for controlling each solenoid valve for varying the time and opening travel of the respective inlet or exhaust valve according to one or more of the engine's operating parameters.

In a multi-cylinder engine, the inlet ports of the engine's cylinders are connected to an inlet manifold that receives air for feeding the engine. The operating cycles of each cylinder are obviously but of phase with respect to each other, in consequence of which the induction phases occur at different times. For a series of reasons, of which the different positioning of the cylinder inlet ports with respect to the inlet duct of the inlet manifold, uneven amounts of air can be sucked into the various cylinders of the engine.

The object of this invention is that of resolving this problem for an engine of the type indicated at the beginning.

SUMMARY OF THE INVENTION

In order to achieve this objective, the subject of the invention is an internal combustion multi-cylinder engine possessing all of the above indicated characteristics and also characterized in that the engine has an inlet manifold, connected to the various inlet ports of the engine's cylinders, in which air-feed flow sensors are located, and in that said electronic means of control are capable of detecting the dispersion of air sucked into the various cylinders of the engine on the basis of an output signal from said sensors and for controlling the hydraulic system for actuating the inlet valves of the engine's various cylinders in a differentiated manner, in order to reduce said dispersion to a minimum.

In the engine in accordance with the invention, the dispersion of air sucked into the various cylinders is detected via an airflow sensor located in the inlet duct upstream of the inlet manifold. The purpose of minimizing the dispersion is to try to make the amount of air sucked in by each cylinder reach the average value of air inducted during the engine cycle. As already indicated, dispersion minimization is implemented by control differentiation and, in particular, by the opening times of the inlet valves.

In a preferred form of embodiment, the estimate of the dispersion of inducted air in by each cylinder with respect to the average value is obtained by evaluating the difference between the estimate of air entering the cylinder, which is based on the output signal of said sensors, and a predetermined reference value that must be reached to achieve compensation of the dispersion.

Always in the case of the preferred form of embodiment, the estimate of inducted air is obtained by selecting the most significant sample from those related to the induction phase of the cylinder in question. In particular, the most significant sample is that relative to the maximum value of those related to the induction phase of the cylinder under consideration. The less the inlet duct is restricted by the engine's butterfly valve, the more significant the sample is. In other words, notwithstanding the fact that the amount of air taken in by the engine can be achieved independently of the action of the butterfly valve thanks to the engine's variable valve control system control, the estimate of air entering each cylinder with the herein described method is preferably taken with the butterfly valve completely open. The reference value to be reached that is used in the above-described method is determined in a preliminary, experimental phase. Possible faults and/or malfunctions of air-induction system components that have an impact on the air taken in by a single cylinder can be diagnosed via the real-time analysis of the dispersion of air inducted by the cylinders.

BRIEF DESCRIPTION OF THE DRAWINGS

Further characteristics and advantages of the invention will become clear from the description that follows with reference to the annexed drawings, supplied merely as a non-limitative example, in which.

DETAILED DESCRIPTION OF THE INVENTION

Figure 1:
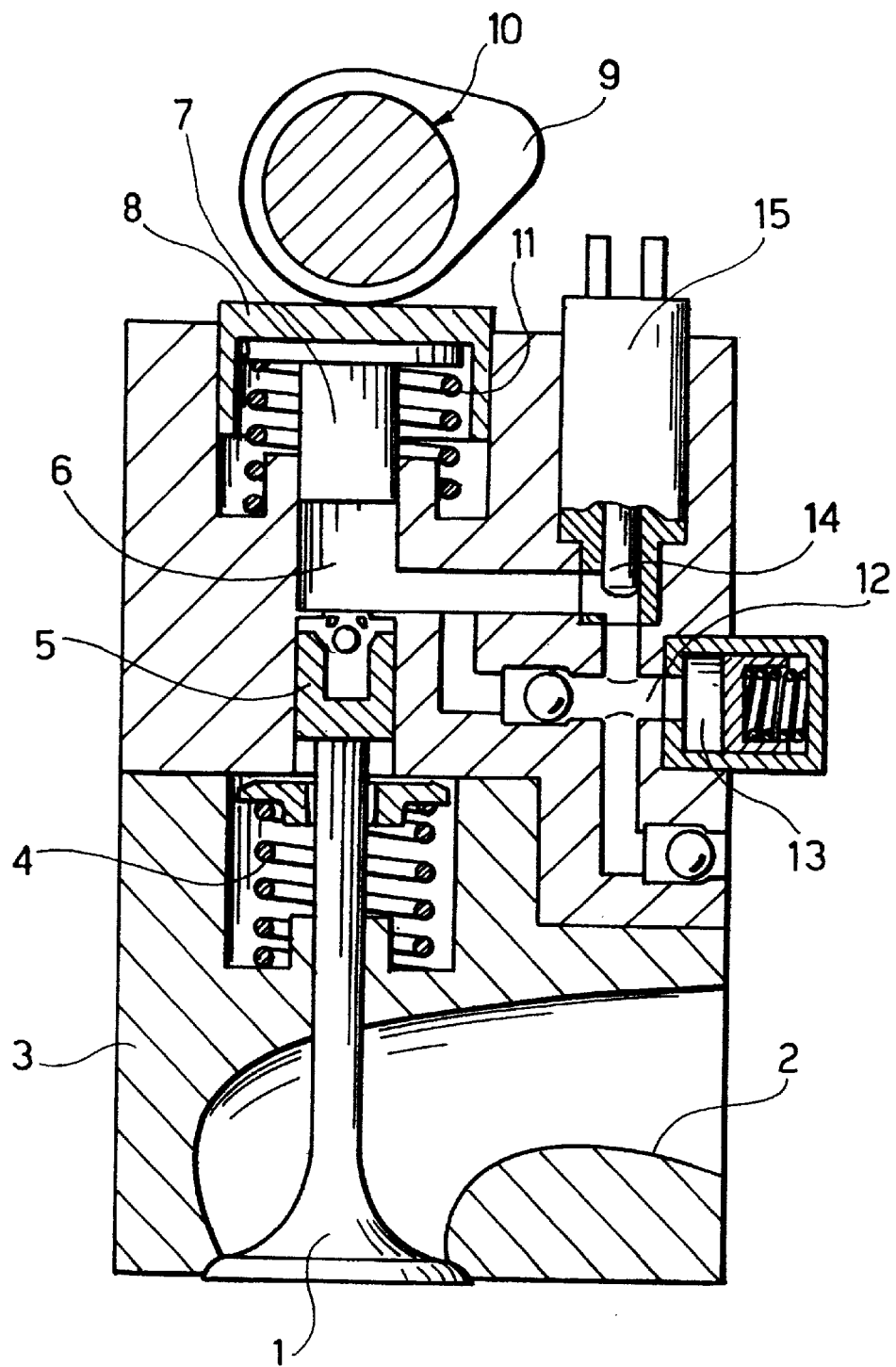
FIG. 1 is a schematic sectional view of an engine according to known technology, which illustrates the principle of operation of the engine's variable valve actuation system.

FIG. 1 schematically illustrates the principle of operation of a variable valve actuation system in an internal combustion engine. Reference number 1 indicates the valve (which can be either an inlet valve or an exhaust valve) as a whole, associated with a respective port 2 (inlet or exhaust) formed inside the cylinder head 3 of an internal combustion engine. The valve 1 is drawn towards its closed position (upwards with reference to FIG. 1) by a spring 4, while it is forced to open by a piston 5 acting on the upper end of the valve stem. The piston 5 is in turn controlled, via oil under pressure that is present in the chamber 6, by a piston 7 that supports a spring cup 8 cooperating with a cam 9 on a camshaft 10. The spring cup 8 is held in sliding contact with the cam 9 by a spring 11. The pressure chamber 6 can be connected to a port 12, which in turn communicates with a pressure accumulator 13, via the shutter 14 of a solenoid valve 15 that is commanded by the electronic means of control (not illustrated) according to the engine's operating conditions. When the solenoid valve 15 is opened, oil under pressure inside the chamber 6 is discharged, causing the valve 1 to rapidly close under the effect of the return spring 4.

When the solenoid valve 15 is closed, the oil present in the chamber 6 transmits the movements of the piston 7 to the piston 5 and thus to the valve 1, in consequence of which the position of the valve 1 is determined by the cam 9. In other words, the cam 9 normally controls the opening of the valve 1 according to a cycle that depends on the profile of the cam, but it can be "disabled" any time it is wished by opening the solenoid valve 15, thereby interrupting the connection between the piston 7 and the valve 1.

Figure 2:
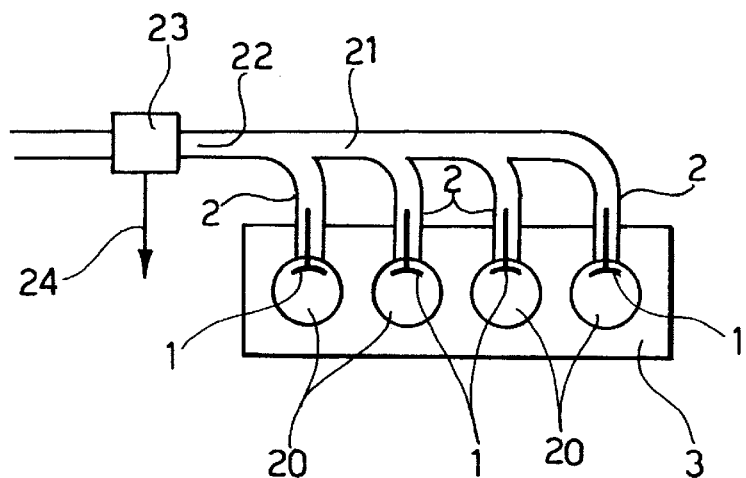
FIG. 2 is a schematic view that illustrates the head of a 4-cylinder engine with the relative inlet manifold.

FIG. 2 schematically illustrates the head 3 of an engine in accordance with the invention, including four cylinders 20. An inlet port 2 and the relative valve 1 are shown for each cylinder. The inlet ports 2 branch out from an inlet manifold 21 that receives air from an inlet duct 22 in which an airflow meter 23 or flow-rate sensor is located in accordance with the invention, which is capable of generating an output signal 24 indicating the flow of inducted air passing through the duct 22. As this phase of induction is realized at different moments in time for each cylinder 20 with respect to the other cylinders, the flow value detected by the sensor 23 is substantially representative of the amount of air taken in by the cylinder that at that moment happens to find itself in the induction phase.

Figure 3:
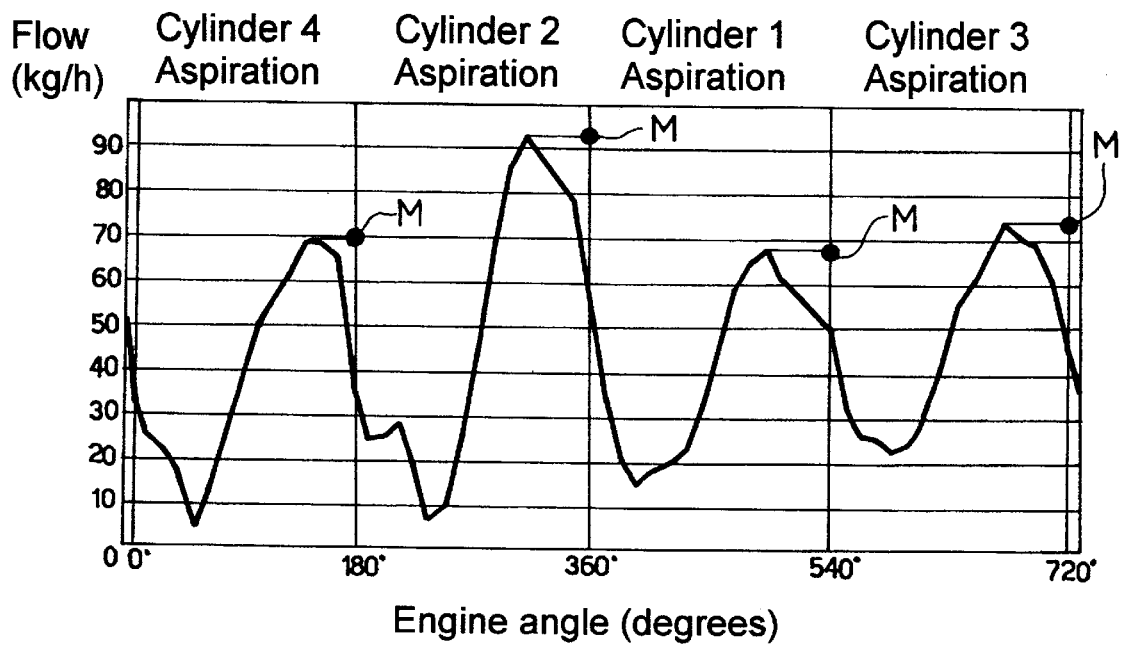
FIG. 3 is a diagram that illustrates the flow of air taken in by the engine's cylinders when actually running, before applying compensation in accordance with the invention.

FIG. 3 shows a diagram illustrating an example of readings taken on an engine of the type shown in FIG. 2. As can be seen, the amount of air sucked into each cylinder is not uniform. In the case of the preferred form of embodiment, the output signal from the sensor 23, representing the airflow (expressed in Kg/h for example) is sampled, for example, at 1 ms intervals. FIG. 3 shows that the maximum values M of inducted air for each cylinder are different from each other.

Figure 4:
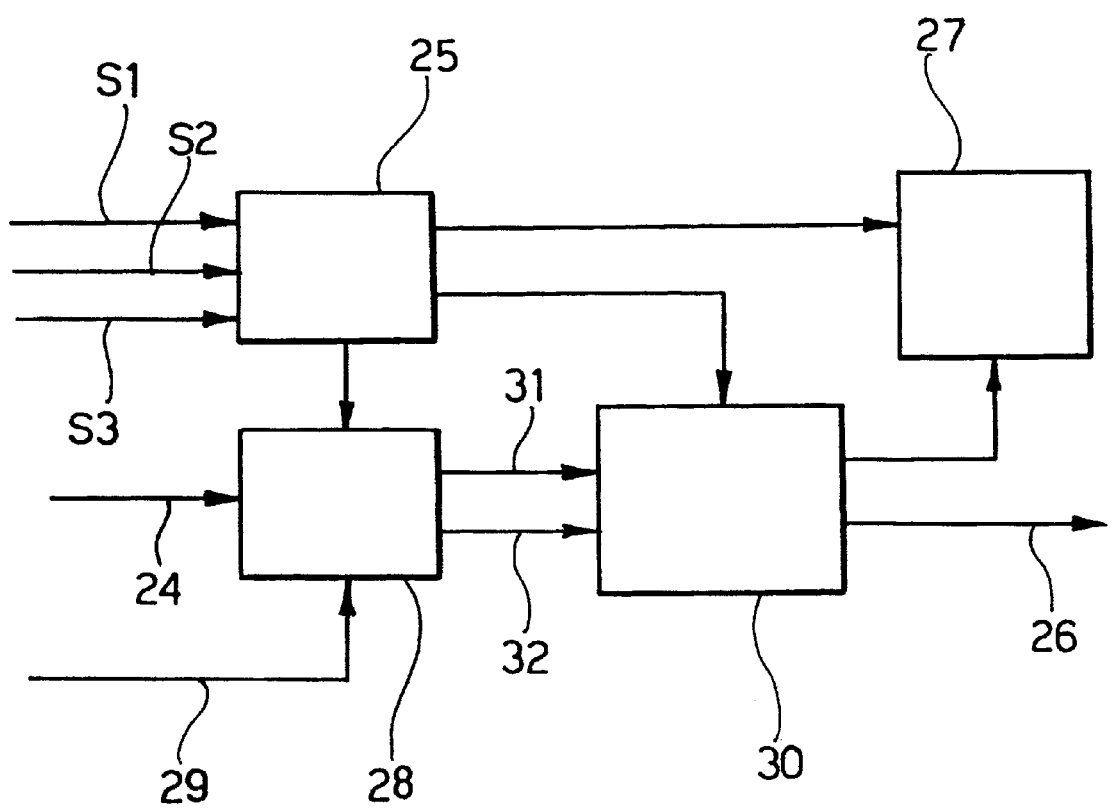
FIG. 4 is a block diagram that illustrates the principle upon which the invention is based.

FIG. 4 illustrates a block diagram of the control system in accordance with the invention. Reference number 25 indicates the normal control unit that sends a signal 26 to the solenoid valves (FIG. 1) associated with the various actuators of the engine's inlet valves that cause the solenoid valves 15 to open and, in consequence, the time and opening travel of each inlet valve. This result is achieved, according to known technology, in function of a series of signals S1, S2 and S3 sent by the corresponding sensors to the control unit 25 and representing various operating parameters of the engine. On the basis of the detected engine operating conditions, the control unit 25 sends a command signal 26 to the solenoid valves, with the interposition of a diagnostics block 27.

According to the invention, an auxiliary block 28 is provided for estimating the dispersion of the air entering each cylinder of the engine. Block 28 receives a signal 24 in input that is supplied by the airflow sensor 23, as well as a signal 29, composed of an index representing the cylinder that is in the induction phase each time. Block 28 estimates the difference in the amount of air taken in by the individual cylinders and sends to block 30 a signal 31 with the index of the cylinder under exam and a signal 32 representing the measured quantity with reference to said cylinder. The adaptive control block 30 intervenes to correct the signal 26 generated by the control unit 25, giving rise to a corrected signal that changes the time and the opening travel of the inlet valve of each cylinder for the purpose of minimizing the detected dispersion. As has already been said, the dispersion is evaluated as the difference between a measured sample M and a predetermined reference value that is experimentally established beforehand.

As already said, the more the choking of the inlet duct by the engine-actuated butterfly valve is reduced, the more significant the aforesaid estimate is. Therefore, the method in accordance with the invention is preferably actuated with the butterfly valve held open.

As has already been indicated, the real-time analysis of the dispersion of air entering the cylinders permits the diagnosis of possible faults and/or malfunctions in the components of the air induction system that have an effect on the air entering the individual cylinders. This function is performed by block 27 in FIG. 4.

Figure 5:
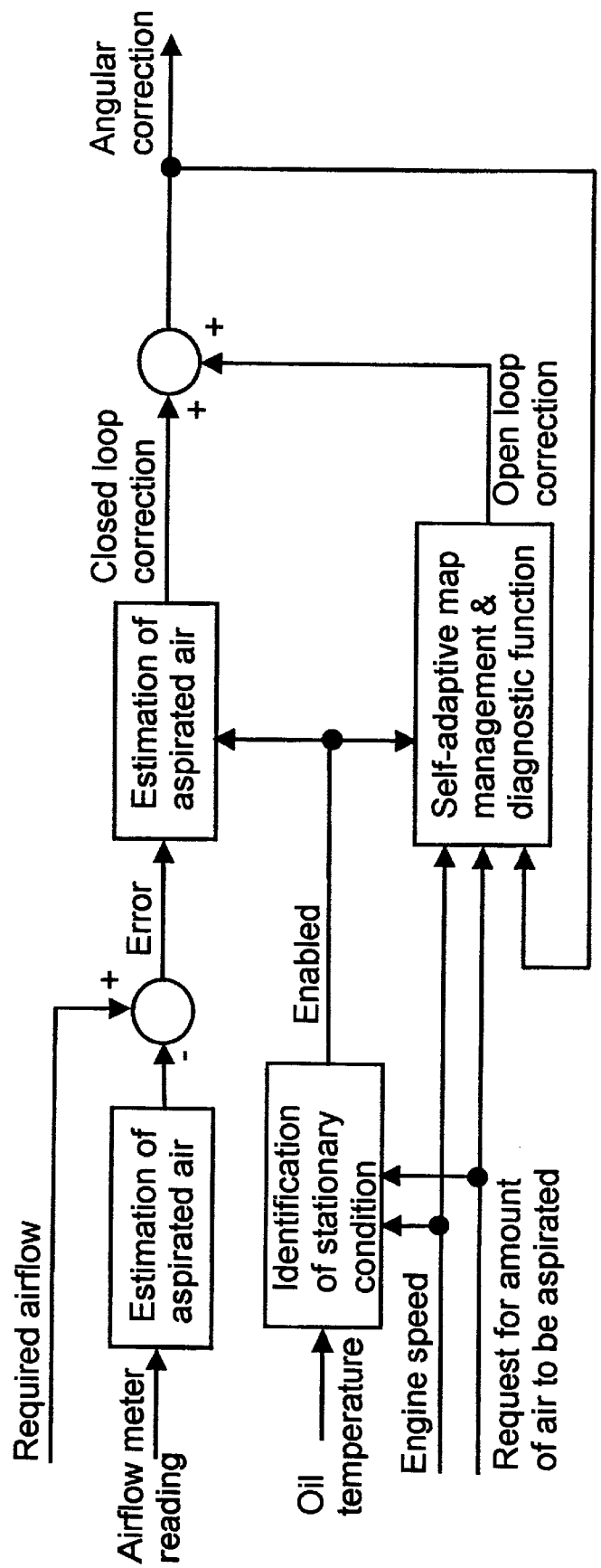
FIG. 5 illustrates an alternative system.

FIG. 5 illustrates an alternative system in which the electronic means of control implement a strategy of compensation and diagnosis of the air taken in by the engine with independent and variable actuation of the inlet valves. This strategy includes the following operations:

estimation of the air aspirated by the engine, based on the measurement of airflow provided by a flow-rate sensor or airflow meter, control of the average quantity of air aspirated by all cylinders using a closed-loop strategy, based on the error between the air required and the estimate of aspirated air in stationary conditions; correction occurs by adjusting the opening angles for the valves controlled in Late Opening Valve Mode or the closing angles of the inlet valves controlled in Early Closing Valve Mode, storing the corrections on self-adaptive maps, also active in transitory states, diagnosis of mean correct operation of the inlet valves based on the values stored in the self-adaptive maps, diagnosis/identification of the correctly actuated, individual inlet valve of a cylinder; this identification is based on a reading of the value acquired by the airflow meter in fuel cut-off conditions with just one of the two inlet valves alternatively actuated.

Naturally, the principle of the invention being understood, the constructional details and forms of embodiment could be extensively changed with respect to that described and illustrated, by way of example, without leaving the scope of this invention.

What is claimed is:

1. A multi-cylinder combustion engine, comprising:
 at least one inlet valve for each cylinder, equipped with respective elastic means of return that push the valve towards a closed position, for controlling the respective inlet port,
 at least one camshaft for operating each inlet valve of the cylinders of the engine via the respective valve lifters, each inlet valve being controlled by a respective cam of said camshaft,
 in which each of said valve lifters commands the respective inlet valve against the action of said elastic means of return via the interposition of hydraulic means including a pressurized fluid chamber,
 the pressurized fluid chamber associated with each inlet valve being suitable for connection via a solenoid valve to an discharge channel for the purpose of decoupling the valve from its respective valve lifter and provoking rapid closure of the valve under the effect of the elastic means of return, and electronic means of control for controlling each solenoid valve to vary the time and opening travel of the respective inlet valve in function of one or more of the engine's operating parameters, wherein the inlet ports controlled by said inlet valves communicate with a single inlet duct in which sensors for detecting the air flow through said inlet duct are situated, and detecting means for detecting the difference in air aspirated by the cylinders of the engine during the respective induction phase and the electronic means of control controlling the time and opening travel of the various cylinders in a differentiated manner for the purpose of minimizing the dispersion detected in the air aspirated by the various cylinder.

2. An engine according to claim 1, wherein said electronic means of control are capable of estimating the dispersion of air aspirated by the cylinders on the basis of a comparison between the air aspirated by each cylinder and a predetermined reference value.

3. An engine according to claim 2, wherein the estimate of air aspirated by each cylinder is obtained by selecting a significant sample from those taken during the induction phase of each cylinder.

4. An engine according to claim 3, wherein said significant sample is the maximum value of air flow detected during the induction phase of each cylinder.

5. An engine according to claim 4, wherein said predetermined reference value is determined beforehand by experiment.

6. An engine according to claim 1, wherein said electronic means of control include a diagnostics unit capable of diagnosing possible faults and/or malfunctions of the engine's air induction system on the basis of the readings of the air aspirated by each cylinder.

7. A procedure for the control of a multi-cylinder combustion engine comprising, at least one inlet valve for each cylinder, equipped with respective elastic means of return that push the valve towards a closed position, for controlling the respective inlet port, at least one camshaft for operating each inlet valve of the cylinders of the engine via the respective valve lifters, each inlet valve being controlled by a respective cam of said camshaft, in which each of said valve lifters commands the respective inlet valve against the action of said elastic means of return via the interposition of hydraulic means including a pressurized fluid chamber, the pressurized fluid chamber associated with each inlet valve being suitable for connection via a solenoid valve to an discharge channel for the purpose of decoupling the valve from its respective valve lifter and provoking rapid closure of the valve tinder the effect of the elastic means of return, and electronic means of control for controlling each solenoid valve to vary the time and opening travel of the respective inlet valve in function of one or more of the engine's operating parameters, wherein the inlet ports controlled by said inlet valves communicate with a single inlet duct in which sensors for detecting the air flow through said inlet duct are situated, detecting means for detecting the difference in air aspirated by the cylinders of the engine during the respective induction phase and the electronic means of control control the time and opening travel of the various cylinders in a differentiated manner for the purpose of minimizing the dispersion detected in the air aspirated by the various cylinder, wherein the difference in air aspirated by the cylinders of the engine during the respective induction phase is detected, and the time and opening travel of the inlet valves of the various cylinders is controlled in a differentiated manner for the purpose of minimizing the dispersion detected in the air aspirated by the various cylinders.

8. A procedure according to claim 7, wherein the dispersion estimate is performed on the basis of a comparison between the detected value for the amount of air aspirated by each cylinder and a reference value.

9. A procedure according to claim 8, wherein the estimate of the amount of air aspirated by each cylinder is performed by selecting a significant sample from the air measurements taken during the induction phase of each cylinder.

10. A procedure according to claim 9, wherein said significant sample is that relative to the maximum airflow value measured during the induction phase of each cylinder.

11. A procedure according to claim 10, wherein said reference value is experimentally determined.

12. A procedure according to claim 11, wherein a diagnosis of possible faults and malfunctions of the engine's air induction system is made on the basis of said estimate of the dispersion of air aspirated by the cylinders of the engine.

13. An engine according to claim 1, wherein said electronic means of control are capable of performing 20 the following operations:

estimation of the air aspirated by the engine, based on the measurement of airflow provided by said flow-rate sensor, control of the average quantity of air aspirated by all cylinders according to a closed-loop strategy, based on the error between the air required and the estimate of aspirated air in stationary conditions, with correction effected via adjustments to the opening time of the inlet valves, storing the corrections on self-adaptive maps, also active in transitory states, diagnosis of mean correct operation of the inlet valves based on the values stored in the self-adaptive maps, diagnosis/identification of the individual inlet valve of a cylinder that is correctly actuated on the basis of a reading of the value acquired by the pressure sensors in fuel cut-off conditions with just one of the two inlet valves alternatively actuated.

* * * * *